United States Patent
Park et al.

(10) Patent No.: US 9,690,364 B2
(45) Date of Patent: Jun. 27, 2017

(54) SYSTEMS AND METHODS FOR DYNAMICALLY ADJUSTING MEMORY STATE TRANSITION TIMERS

(71) Applicant: QUALCOMM INCORPORATED, San Diego, CA (US)

(72) Inventors: Hee Jun Park, San Diego, CA (US); Haw-Jing Lo, San Diego, CA (US); Keunsoo Roh, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 32 days.

(21) Appl. No.: 14/846,306

(22) Filed: Sep. 4, 2015

(65) Prior Publication Data

US 2017/0068308 A1    Mar. 9, 2017

(51) Int. Cl.
G06F 1/32 (2006.01)

(52) U.S. Cl.
CPC .......... *G06F 1/3296* (2013.01); *G06F 1/3206* (2013.01); *G06F 1/3228* (2013.01); *G06F 1/3275* (2013.01)

(58) Field of Classification Search
CPC .... G06F 1/3203; G06F 1/3275; G06F 1/3206; G06F 1/3296
USPC ........................................................ 713/320
See application file for complete search history.

(56) References Cited

U.S. PATENT DOCUMENTS

| | | | |
|---|---|---|---|
| 5,913,067 A | 6/1999 | Klein | |
| 7,610,497 B2 | 10/2009 | Lin et al. | |
| 7,930,565 B2 * | 4/2011 | Saewong | G06F 1/3203 713/300 |
| 8,090,967 B2 * | 1/2012 | Hallnor | G06F 1/3203 713/323 |
| 8,341,436 B2 * | 12/2012 | Ehmann | G06F 1/3203 712/200 |
| 8,606,991 B2 * | 12/2013 | Sun | G11C 11/406 711/106 |
| 8,738,937 B2 * | 5/2014 | David | G06F 1/3203 713/300 |
| 8,971,194 B2 | 3/2015 | Tofighbakhsh et al. | |
| 9,104,421 B2 * | 8/2015 | Ahmad | G06F 9/4418 |
| 2001/0043493 A1 | 11/2001 | Fujioka et al. | |

(Continued)

FOREIGN PATENT DOCUMENTS

| | | |
|---|---|---|
| EP | 1617315 A1 | 1/2006 |
| WO | 2013062701 A1 | 5/2013 |

OTHER PUBLICATIONS

Yi-hua Zhu et al., IEEE Efficient Power Management for Infrastructure IEEE 802.11 WLANs; Wireless Communications, Jul. 2010; vol. 9, Issue: 7, pp. 2196-2205.

(Continued)

*Primary Examiner* — Chun Cao
(74) *Attorney, Agent, or Firm* — Smith Tempel Blaha LLC (57) ABSTRACT

Systems, methods, and computer programs are disclosed for dynamically adjusting memory power state transition timers. One embodiment of a method comprises receiving one or more parameters impacting usage or performance of a memory device coupled to a processor in a computing device. An optimal value is determined for one or more memory power state transition timer settings. A current value is updated for the memory power state transition timer settings with the optimal value.

25 Claims, 8 Drawing Sheets

(56) References Cited

U.S. PATENT DOCUMENTS

2004/0098550 A1* 5/2004 Kareenahalli ....... G06F 13/1689
                                                    711/167
2008/0126815 A1  5/2008 Cantwell et al.
2014/0115365 A1  4/2014 Qin et al.
2014/0157026 A1  6/2014 So et al.
2015/0085594 A1* 3/2015 Dong ................ G11C 11/40626
                                                    365/222

OTHER PUBLICATIONS

Yangcheng Huang et al., Autonomic Tuning of Routing for MANETs; Journal of Networks; Oct. 2009 vol. 4, No. 8, pp. 742-753.
International Search Report and Written Opinion—PCT/US2016/045673—ISA/EPO—Oct. 13, 2016 (153026WO).

* cited by examiner

| INPUTS 502 | | OUTPUTS 504 | |
|---|---|---|---|
| UTILIZATION 506 | DDR FREQUENCY 508 | POWER DOWN TIMER SETTING 510 | PAGE CLOSE TIMER SETTING 512 |
| < 30% | 200 | 4 | 64 |
| < 60% | 200 | 16 | 64 |
| < 20% | 461 | 4 | 128 |
| < 40% | 461 | 16 | 64 |
| < 60% | 461 | 32 | 64 |
| < 30% | 1037 | 2 | 128 |
| < 70% | 1037 | 16 | 128 |
| < 20% | 1555 | 2 | 128 |
| < 35% | 1555 | 4 | 128 |
| < 55% | 1555 | 8 | 128 |
| < 80% | 1555 | 12 | 128 |

| INPUTS 702 | OUTPUTS 704 | |
|---|---|---|
| USE CASE TYPE 706 | POWER DOWN TIMER SETTING 708 | PAGE CLOSE TIMER SETTING 710 |
| WCDMA/GSM VOICE CALL | 4 | 64 |
| VoLTE VOICE CALL | 16 | 64 |
| LTE DATA DOWNLOADING | 4 | 128 |
| GRAPHICS BENCHMARK APP | 64 | 128 |
| DDR BENCHMARK AP | 64 | 128 |
| OTHER USE CASES | 4 | 256 |

SYSTEMS AND METHODS FOR DYNAMICALLY ADJUSTING MEMORY STATE TRANSITION TIMERS

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.). The SoC may be coupled to one or more volatile memory modules or devices, such as, dynamic random access memory (DRAM) via double data rate (DDR) high-performance data and control interface(s).

Existing and future generations of DDR memory (e.g., DDR1, DDR2, DDR3, DDR4, etc.) support two or more memory power states for enabling devices to operate according to desirable power and/or performance modes. At least one of the memory power states may comprise a relatively lower power mode for enabling the device to conserve power. To control the transition between memory power states, DDR memory devices have clock timer settings (e.g., a power down timer, a page close timer, a self-refresh timer), which may impact the idle time duration required to enter the lower power mode. In existing designs, for example, SoC and system manufacturers may program static values for the idle timers based on lab simulation and test results. The static idle timer values may be determined to provide power and performance for overall key use cases. In operation, the predetermined static idle timer values are used regardless of the various use case changes, DDR types and models, changes in power versus performance priority, etc.

When entering the lower power memory state, however, the use of predetermined static settings for the idle timers may yield less than an optimal power and/or performance due to dynamically changing factors. For example, the optimal idle timer values may vary depending on DDR types, models, and generations, as well as changing operational factors, such as, memory traffic patterns, memory operating frequencies, memory traffic amounts, and power versus performance priorities.

Accordingly, there is a need for improved systems and methods for dynamically adjusting memory power state transition timers.

SUMMARY OF THE DISCLOSURE

Systems, methods, and computer programs are disclosed for dynamically adjusting memory power state transition timers. One embodiment of a method comprises receiving one or more parameters impacting usage or performance of a memory device coupled to a processor in a computing device. An optimal value is determined for one or more memory power state transition timer settings. A current value is updated for the memory power state transition timer settings with the optimal value.

Another embodiment is a computer system. The computer system comprises a memory device and a system on chip (SoC). The SoC comprises a processor and a memory controller. The memory controller is electrically coupled to the memory device. The processor executes a memory scheduler configured to determine an optimal value for one or more memory power state transition timer settings used by the memory controller to enter a low power memory state.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
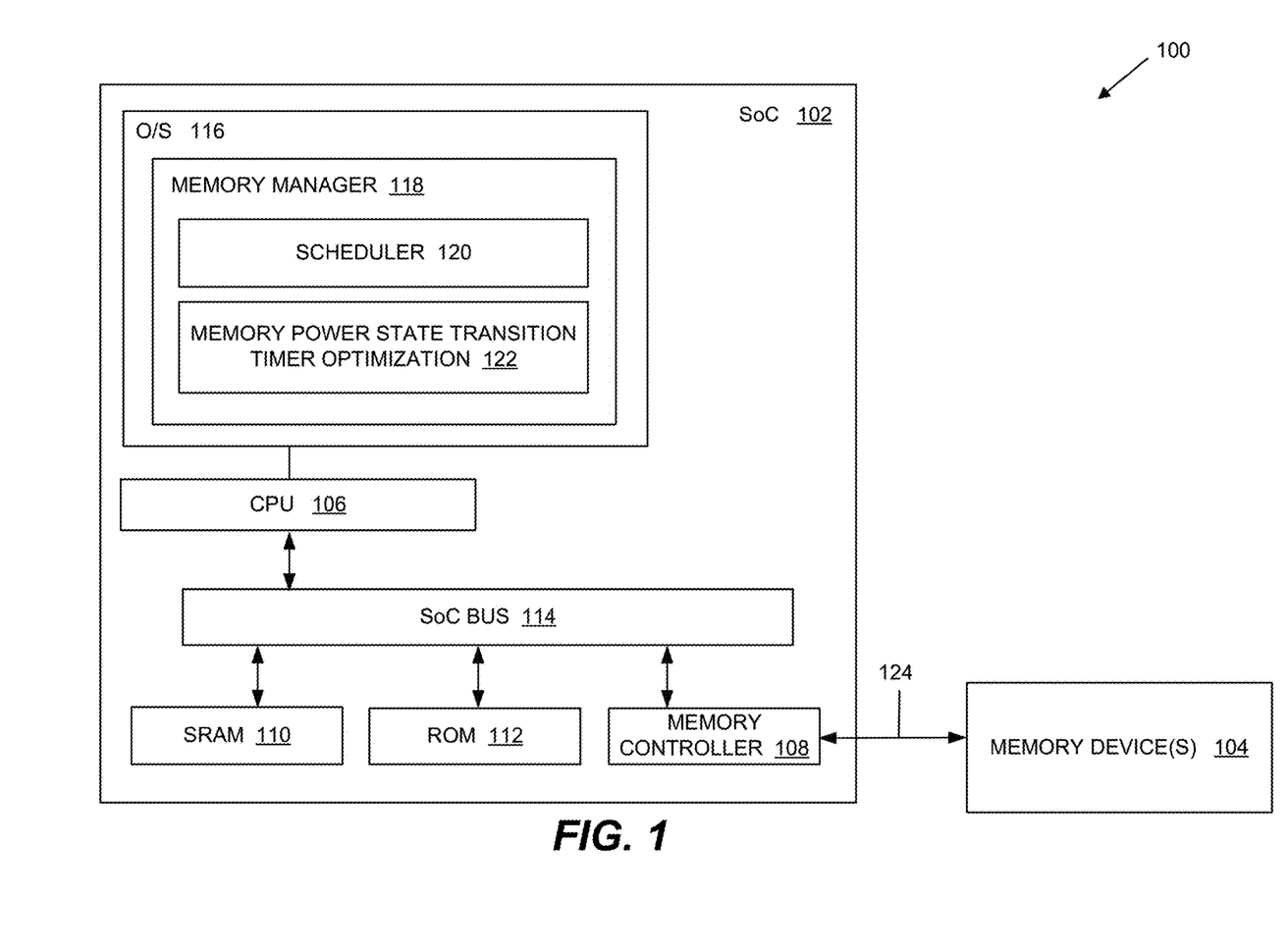
FIG. 1 is a block diagram of an embodiment of a system for dynamically adjusting memory power state transition timers.

FIG. 1 illustrates a system 100 comprising a system on chip (SoC) 102 electrically coupled to one or more memory devices 104. The SoC 102 comprises various on-chip components interconnected via a SoC bus 114. In the embodiment of FIG. 1, the SoC 102 comprises one or more memory clients that request memory resources from the memory device(s) 104. The memory clients may comprise one or more processing units (e.g., central processing unit (CPU) 106, a graphics processing unit (GPU), a digital signal processor (DSP), etc.), a video encoder, or other clients requesting read/write access to the memory device(s) 104. The SoC 102 may further comprise on-chip memory, such as, static random access memory (SRAM) 110 and read only memory (ROM) 112.

It should be appreciated that the system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

Memory controller 108 on SoC 102 is electrically coupled to the memory device(s) 104 via a bus 124. Memory controller 108 manages the flow of data going to and from the memory device(s) 104. Memory controller 108 generally comprises the logic for reading and writing to the memory device(s) 104. In an embodiment, the memory device(s) 104 comprise dynamic random access memory (DRAM) device(s) and the bus 124 comprises a high-performance random access memory (RAM) bus. The memory controller 108 and the DRAM devices may support any existing or future generations of double data rate (DRR) interfaces (e.g., DDR1, DDR2, DDR3, DDR4, etc.).

The memory device(s) 104 and the memory controller 108 may be configured to support two or more memory power states or modes. Each memory power state or mode may be selectively controlled by the memory controller 108 to provide different combinations of memory power consumption and/or memory performance. At least one of the memory power states comprises a relatively lower power memory state for conserving memory power consumption. As further illustrated in FIG. 1, an operating system (O/S 116) executed by the CPU 106 may comprise a memory manager 118. The memory manager 118 generally comprises the logic for allocating memory in the memory device(s) 104 to memory clients. The memory manager 118 may comprise a scheduler component 120 for scheduling memory read/write operations to the memory device(s) 104. The memory manager 118 may further comprise a memory power state transition timer optimization component 122, which generally comprises the logic for dynamically adjusting one or more timer settings used by the memory device(s) 104 to transition from one memory power state to another power state. In an embodiment, the memory power state transition timer optimization component 122 is configured to determine optimal power-saving values for the one or more timer settings used to enter a lower power memory state. The memory power state transition timer optimization component 122 may be implemented in the O/S/116, as illustrated in FIG. 1, or in hardware or firmware.

Figure 2:
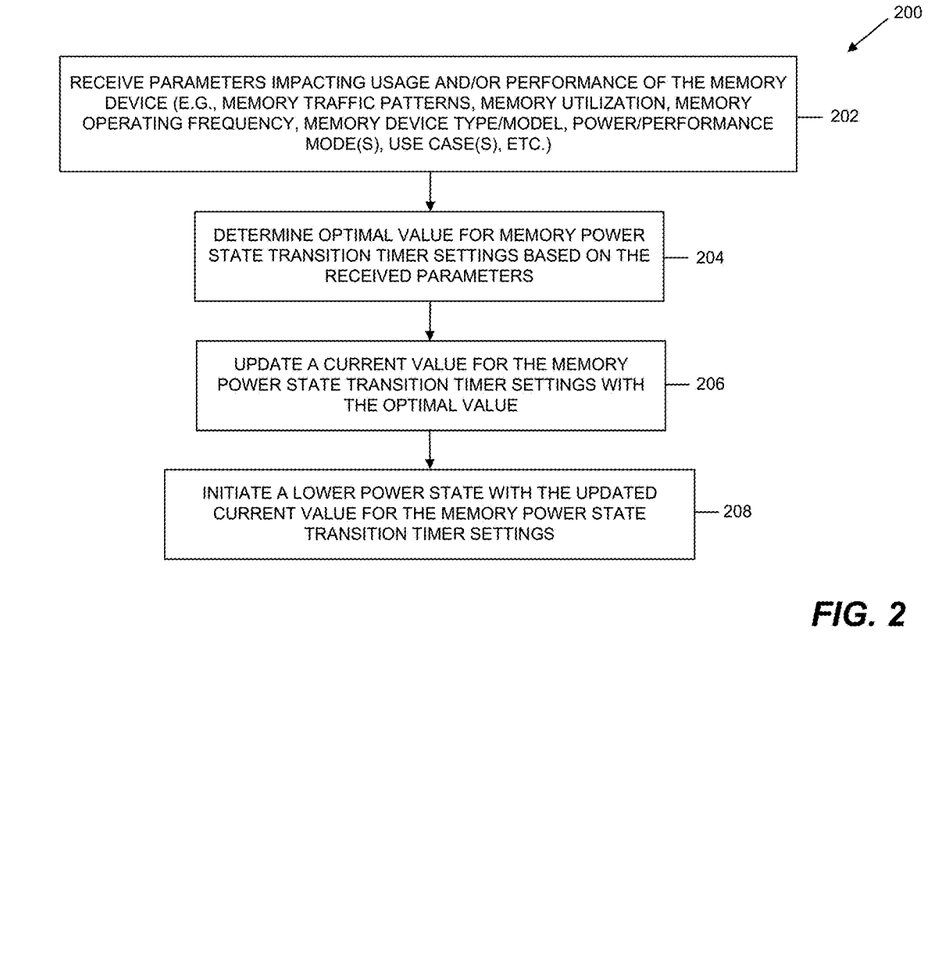
FIG. 2 is a flowchart illustrating an embodiment of a method implemented in the system of FIG. 1 for dynamically adjusting memory power state transition timers.

FIG. 2 illustrates an embodiment of a method 200 implemented in the system 100 for dynamically adjusting memory power state transition timers to yield a power savings in a low power memory state. At block 202, the memory power state transition timer optimization component 122 may receive one or more parameters impacting the usage or performance of the memory device 104. It should be appreciated that the received parameters may be monitored via the operating system 116, the memory manager 118, and/or the scheduler 120. Furthermore, the received parameters may vary depending on, for example, the type of memory device or other components in the system 100. In an embodiment, the received parameters may comprise information related to one or more of the following: memory traffic pattern(s), memory operating frequencies, memory traffic amounts, memory utilization percentage, power and/or performance priorities, system use cases, and types of applications executing. The received parameters may also identify a type, model, and or vendor for the memory device(s) 104.

At block 204, the memory power state transition timer optimization component 122 may determine, based on the one or more received parameters, whether current values for one or more memory power state transition timer settings are to be updated. The memory power state transition timer optimization component 122 may monitor and detect dynamic changes in the received parameters to determine whether current values for the memory power state transition timers are less than optimal for power conservation in the low power memory state. It should be appreciated that the memory power state transition timers may vary depending on the type, generation, model, etc. of the memory device(s) 104. For example, in embodiments where the memory device(s) 104 comprise DRAM, the timers may comprise DDR idle timers such as, for example, a power down timer, a page close timer, or a self-refresh timer.

Regardless the type of memory power state transition timer(s), if the current values are no longer optimally power-saving, new values may be determined based on the received parameters. The new values may be calculated or determined via, for example, a look-up table or other optimization logic. At block 206, the memory power state transition timer optimization component 122 may update the values for the memory power state transition timers with an optimal value based on or more of the received parameters. The optimal value may be provided to and stored in the memory controller 108 for use when entering the low power memory state (block 208).

Figure 3:
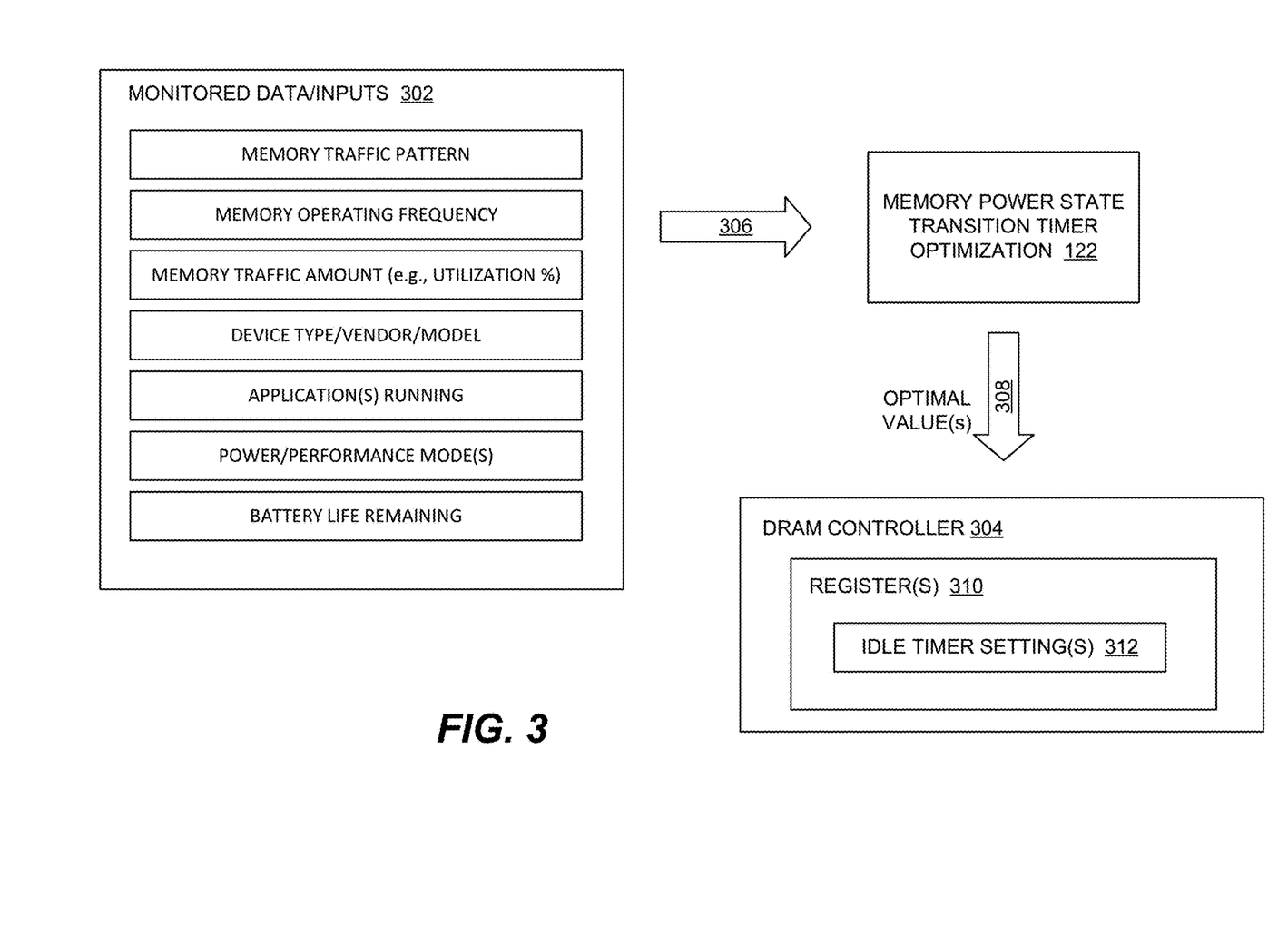
FIG. 3 is a block diagram illustrating the data inputs and outputs of an embodiment of the memory power state transition manager of FIG. 1.

FIG. 3 is a block diagram illustrating exemplary data inputs and outputs for an embodiment of the memory power state transition timer optimization component 122. In this embodiment, the memory power state transition timer optimization component 122 is configured to determine optimal values for DDR idle timer settings 312 used by DRAM devices to enter a low power memory state. A DRAM controller 304 may store current values for the DDR idle timer settings 312 in one or more registers 310. During system operation, the memory power state transition timer optimization component 122 may monitor and/or receive various data inputs 302, as illustrated at arrow 306. The data inputs 302 may comprise various information related to memory usage such as, for example, memory traffic patterns, memory operating frequencies, memory traffic amounts or utilization percentage, and the memory device type, vendor, or model. The data inputs 302 may also comprise information related to memory power and/or performance priorities or modes, application(s) being executed, battery life remaining, or any other conditions or parameters that may impact the optimal values for the DDR idle timer settings.

Figure 4:
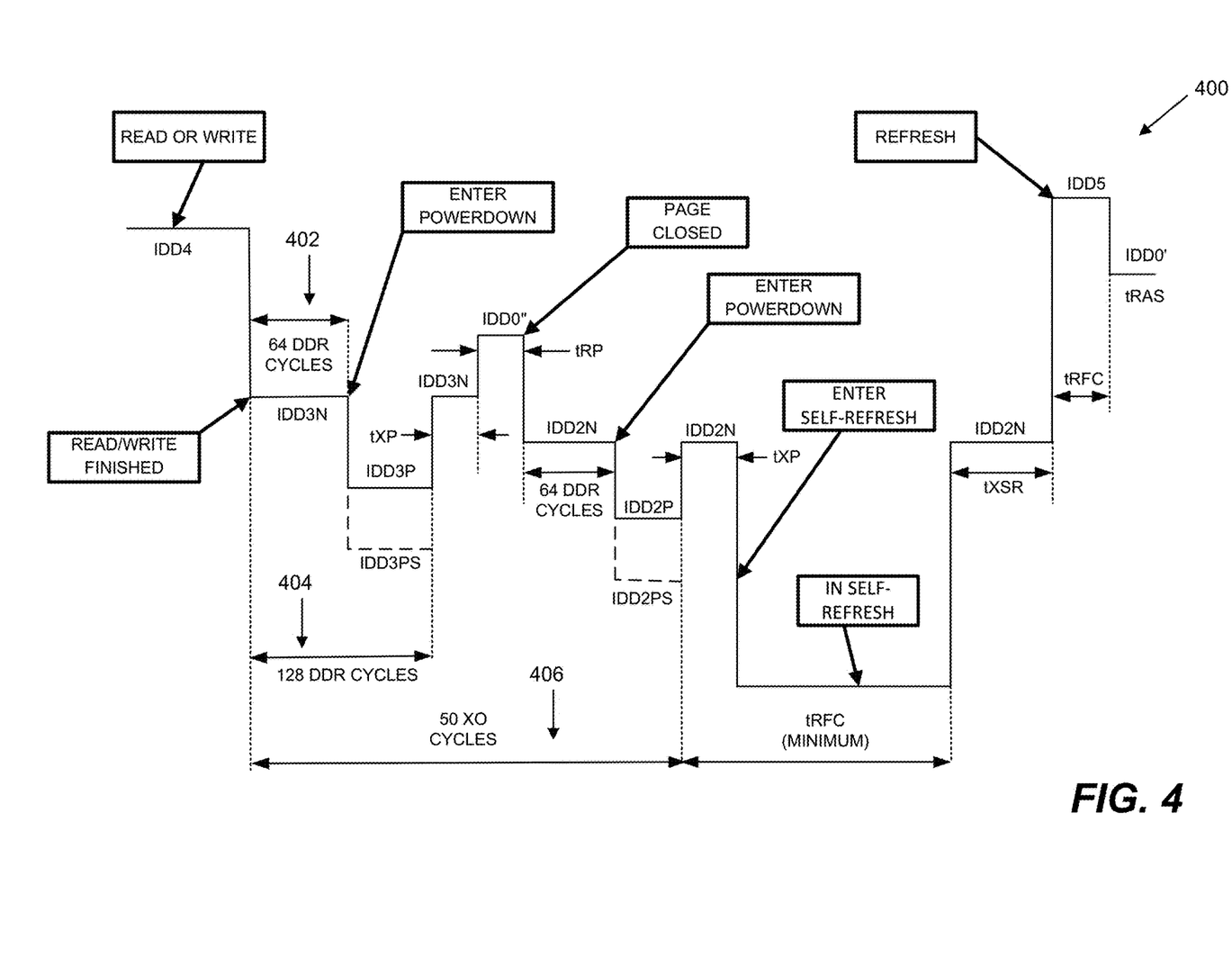
FIG. 4 is a timing diagram illustrating exemplary embodiments of idle timers that may be dynamically adjusted to optimize power consumption in a lower power state of dynamic random access memory (DRAM) device.

FIG. 4 is a timing diagram 400 illustrating the operation of various exemplary DDR idle timers that may be dynamically adjusted by the memory power state transition timer optimization component 122. Timing diagram 400 shows operation of a power down idle timer 402, a page close idle timer 404, and a self-refresh idle timer 406. The duration of idle timers 402, 404, and 406 may be controlled by corresponding idle timer settings 312 stored in the register(s) 310. In the example of FIG. 4, the power down idle timer 402 has a current value of 64 DDR clock cycles. The page close idle timer 404 has a current value of 128 DDR clock cycles. The self-refresh idle timer 404 has a current value of 50 cycles of a crystal oscillator. Referring again to FIG. 3, the memory power state transition timer optimization component 122 may determine optimal values for timers 402, 404, and 406 based on the data inputs 302.

Figure 5:
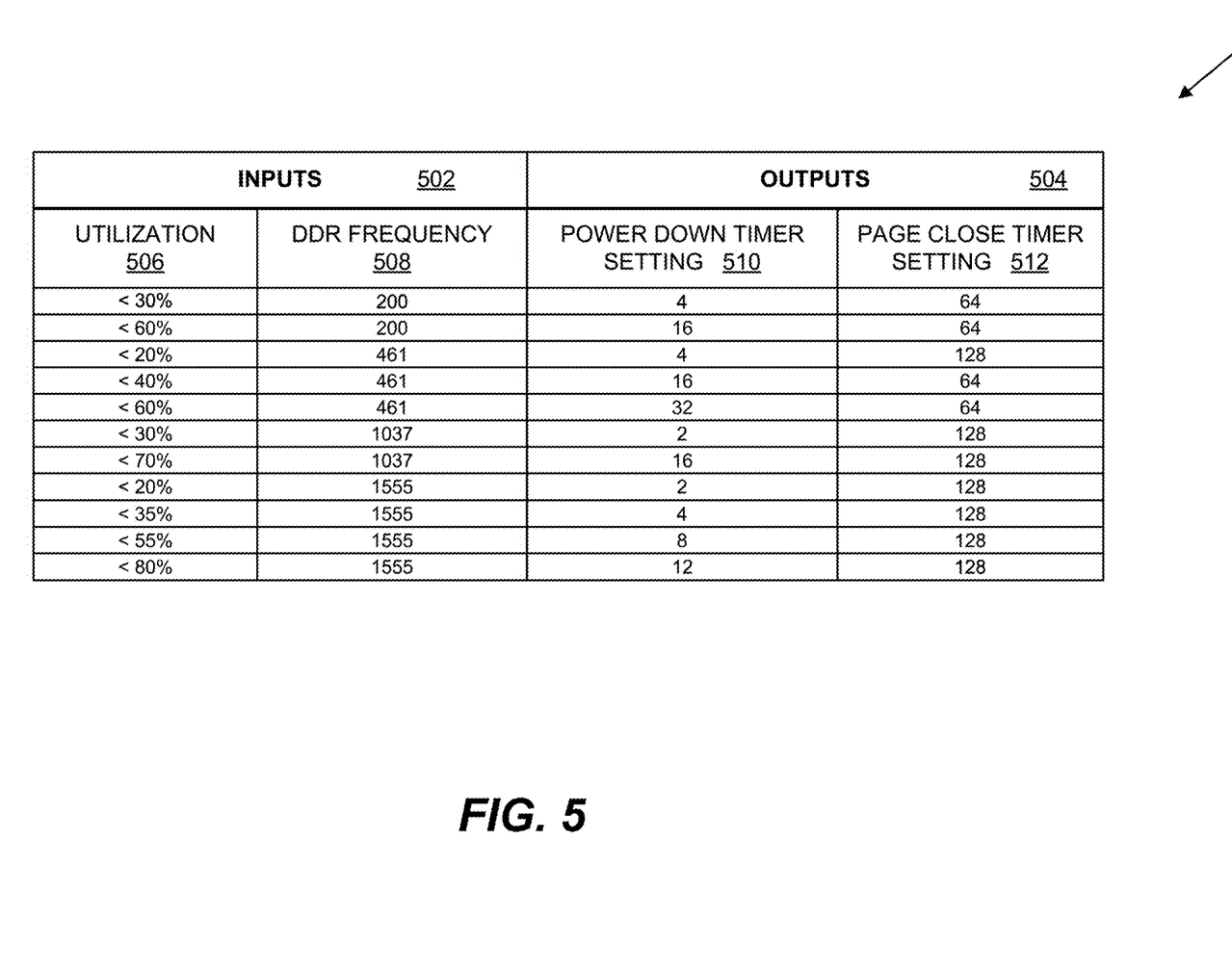
FIG. 5 is a block diagram illustrating an embodiment of a look-up table for determining optimal power down timer and page down timer settings based on a memory utilization percentage and a memory operating frequency.

It should be appreciated that the optimal values may be determined in various ways. In one embodiment, the memory power state transition timer optimization component 122 accesses a look-up table to determine the idle timer settings (i.e., data output(s)) that correspond to one or more of the data inputs 302. FIG. 5 illustrates a look-up table 500 for determining optimal power down timer and page down timer settings based on a memory utilization percentage and a memory operating frequency. Column 502 illustrates values for combinations of a memory utilization percentage 506 and a DDR frequency 508. For each combination of input values in column 502, the table 500 lists the corresponding output values in column 504. The corresponding output value for the power down timer is identified in column 510, and the corresponding output value for the page close timer is identified in column 512. For example, referring to the top row in table 500, if the memory utilization percentage is less than 30% and the DDR frequency is 200 MHz, the look-up table 500 determines that the values for the power down timer and the page close timer should be updated to 4 and 64 DDR cycles, respectively. It should be appreciated that the inputs 502 and outputs 504 may be based on simulated data and programmed into the registers 310 as default values.

Figure 7:
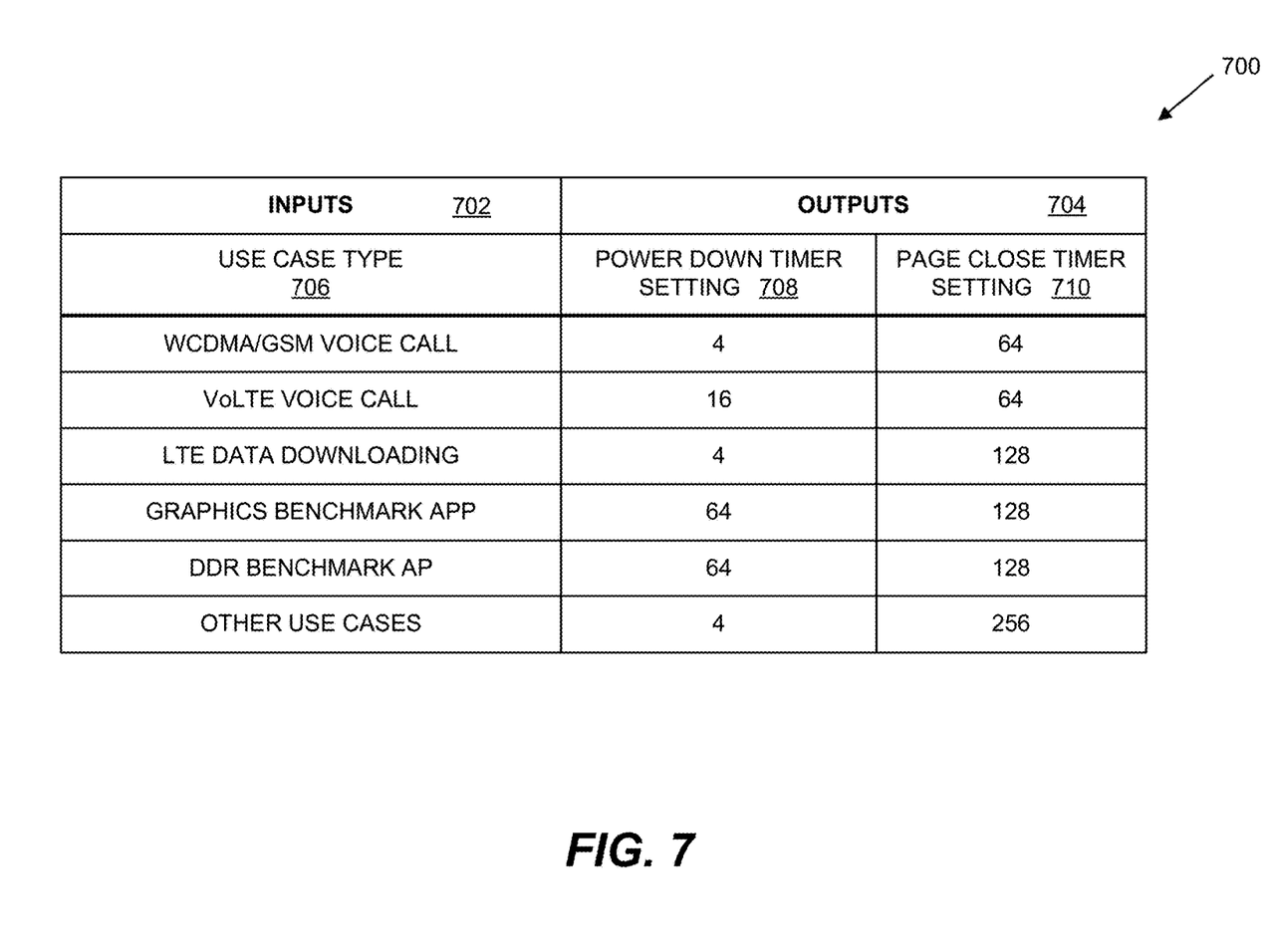
FIG. 7 is a block diagram illustrating another embodiment of a look-up table for determining optimal power down timer and page down timer settings based on use case types.

FIG. 7 illustrates another embodiment of a look-up table 700 for determining the optimal power down timer and page close timer settings based on use case types. The use case types listed in column 706 define the table inputs. For each use case type, the table 700 lists the corresponding output values in column 704. The corresponding output value for the power down timer is identified in column 708, and the corresponding output value for the page close timer is identified in column 710. In the example of FIG. 7, the use case types may comprise one or more of the following: a voice call using wideband code division multiple access (WCDMA) or Global System for Mobile Communication (GSM); a voice call over Long-Term Evolution (LTE); LTE data downloading; graphics benchmark application; DDR benchmark application; or any other use cases. It should be appreciated that the inputs 702 and outputs 704 may also be based on simulated data and programmed into the registers 310 as default values. In other embodiments, the memory power state transition timer optimization component 122 may be configured to calculate the optimal values for the DDR idle timer settings based on an average idle timer duration.

Figure 6:
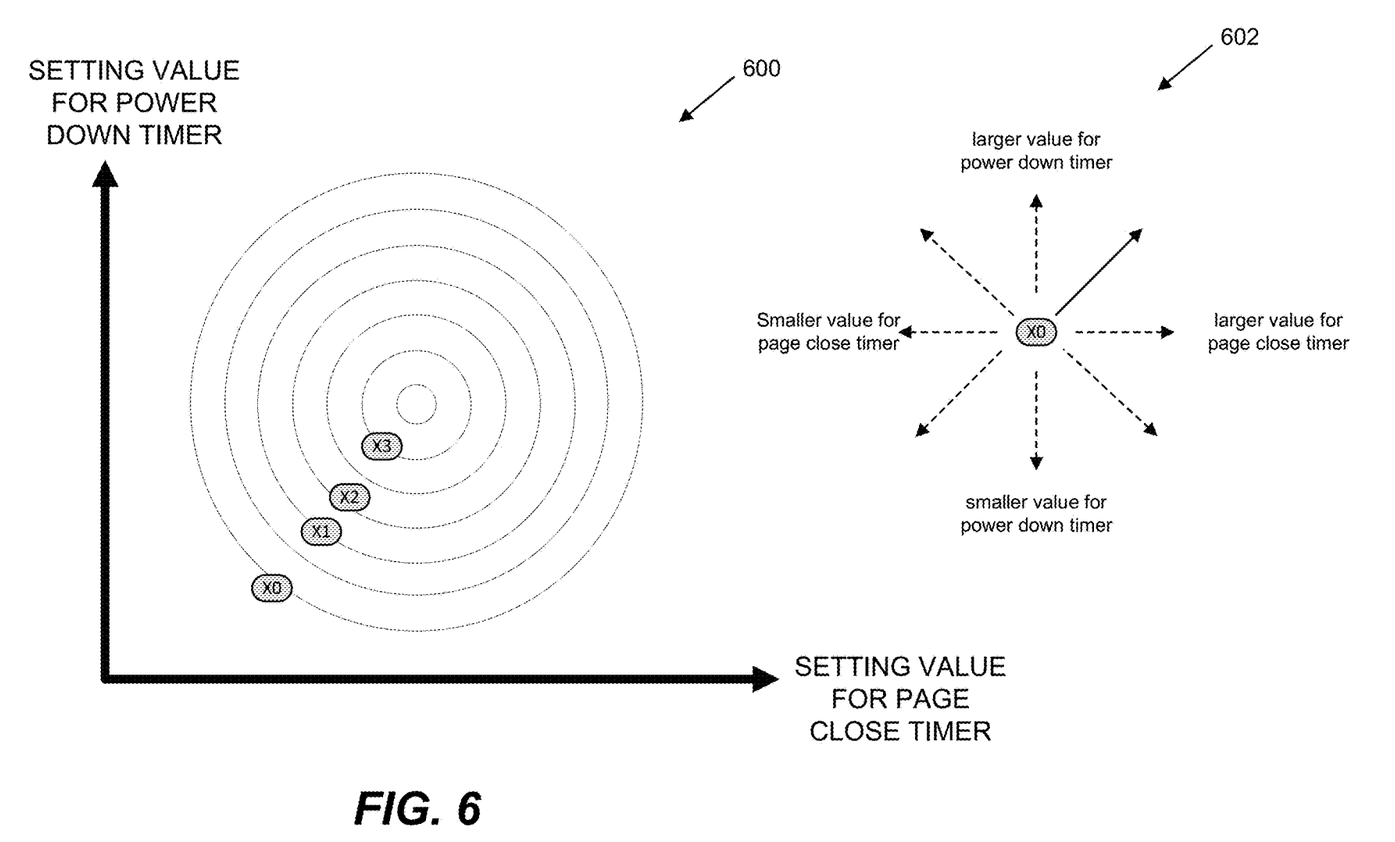
FIG. 6 is a graph illustrating an embodiment of an iterative search method for determining optimal idle timer settings.

FIG. 6 is a graph 600 illustrating another embodiment for determining the optimal idle timer settings using an iterative search method. The x-axis represents values for the page close timer, and the y-axis represents values for the power down timer. During operation of the system 100, a search algorithm may iteratively search for optimal x and y values that yield a lower average memory power. In the example of FIG. 6, the search method may start with an initial value combination at X0. The search algorithm may estimate power and/or performance for adjacent value combinations. As illustrated in FIG. 6, adjacent values with larger and smaller values for both the power down timer and the page close timer may be searched to determine whether an adjacent value yields better power and/or performance. The search method may be configured to iteratively identify subsequent value combinations X1, X2, X3, etc. until an optimal value combination is determined that yields the lowest possible average memory power.

Figure 8:
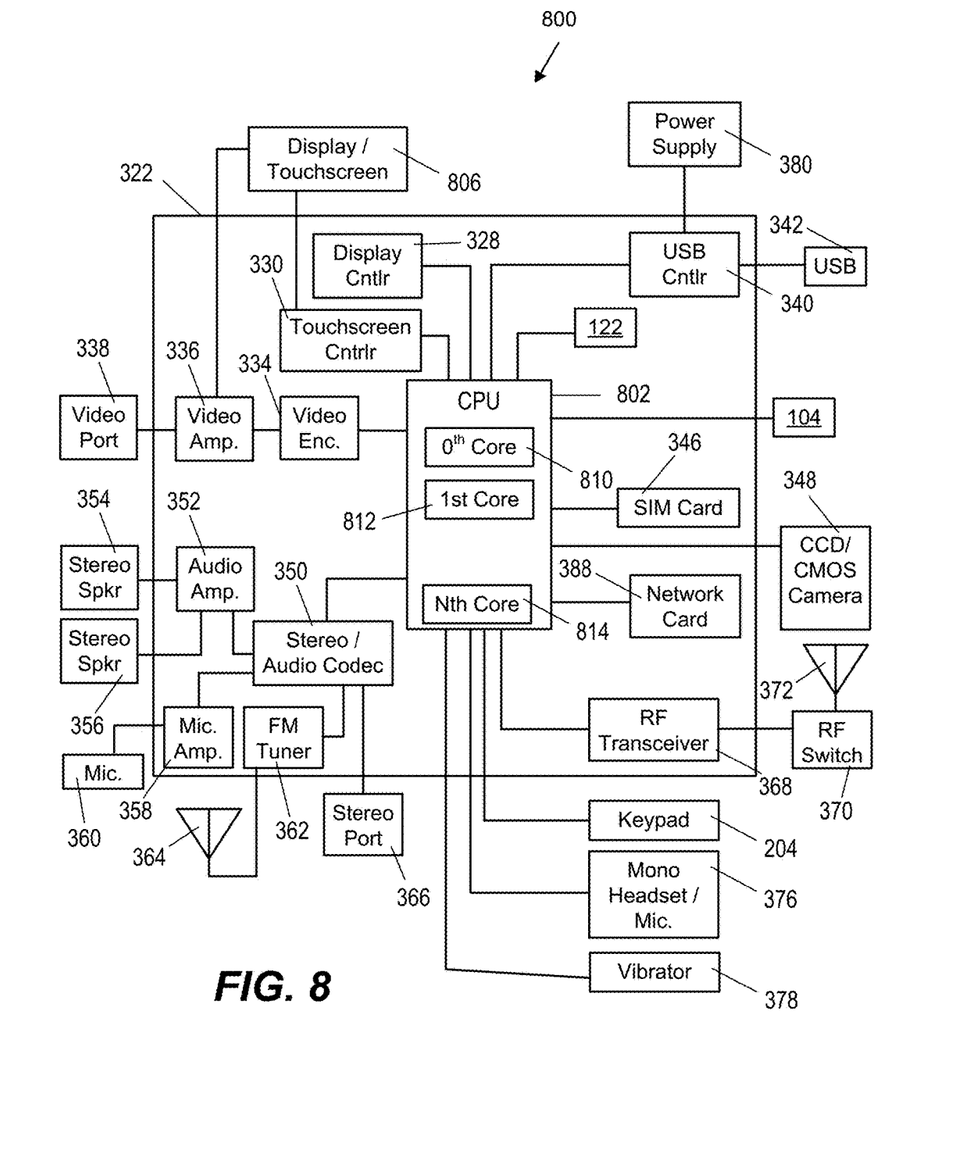
FIG. 8 is a block diagram of an embodiment of a portable communication device for incorporating the system of FIG. 1.

As mentioned above, the system 100 may be incorporated into any desirable computing system. FIG. 8 illustrates the system 100 incorporated in an exemplary portable computing device (PCD) 800. It will be readily appreciated that certain components of the system 100 are included on the SoC 322 while other components (e.g., the DRAM 104) are external components coupled to the SoC 322. The SoC 322 may include a multicore CPU 802. The multicore CPU 802 may include a zeroth core 810, a first core 812, and an Nth core 814. One of the cores may comprise, for example, a graphics processing unit (GPU) with one or more of the others comprising the CPU.

A display controller 328 and a touch screen controller 330 may be coupled to the CPU 802. In turn, the touch screen display 806 external to the on-chip system 322 may be coupled to the display controller 328 and the touch screen controller 330.

FIG. 8 further shows that a video encoder 334, e.g., a phase alternating line (PAL) encoder, a sequential color a memoire (SECAM) encoder, or a national television system (s) committee (NTSC) encoder, is coupled to the multicore CPU 802. Further, a video amplifier 336 is coupled to the video encoder 334 and the touch screen display 806. Also, a video port 338 is coupled to the video amplifier 336. As shown in FIG. 8, a universal serial bus (USB) controller 340 is coupled to the multicore CPU 802. Also, a USB port 342 is coupled to the USB controller 340. Memory 104 may be coupled to the SoC 322 (as illustrated in FIG. 1).

Further, as shown in FIG. 8, a digital camera 348 may be coupled to the multicore CPU 802. In an exemplary aspect, the digital camera 348 is a charge-coupled device (CCD) camera or a complementary metal-oxide semiconductor (CMOS) camera.

As further illustrated in FIG. 8, a stereo audio coder-decoder (CODEC) 350 may be coupled to the multicore CPU 802. Moreover, an audio amplifier 352 may coupled to the stereo audio CODEC 350. In an exemplary aspect, a first stereo speaker 354 and a second stereo speaker 356 are coupled to the audio amplifier 352. FIG. 8 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 8 further illustrates that a radio frequency (RF) transceiver 368 may be coupled to the multicore CPU 802. An RF switch 370 may be coupled to the RF transceiver 368 and an RF antenna 372. A keypad 204 may be coupled to the multicore CPU 802. Also, a mono headset with a microphone 376 may be coupled to the multicore CPU 802. Further, a vibrator device 378 may be coupled to the multicore CPU 802.

FIG. 8 also shows that a power supply 380 may be coupled to the on-chip system 322. In a particular aspect, the power supply 380 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 8, the touch screen display 806, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for dynamically adjusting memory power state transition timers, the method comprising:
    receiving one or more parameters corresponding to usage of a memory device coupled to a processor in a computing device, the parameters comprising a memory utilization percentage and one or more of a memory traffic pattern, a memory operating frequency, a memory traffic amount, and a power/performance mode;
    based on the one or more parameters, determining a desired value for one or more memory power state transition timer settings for the memory device; and
    updating a current value for the memory power state transition timer settings for the memory device with the desired value.

2. The method of claim 1, wherein the memory power state transition timer settings comprise an idle timer setting for entering a lower power memory state.

3. The method of claim 1, wherein the receiving one or more parameters impacting usage of the memory device comprises: monitoring and detecting a change in the one or more parameters.

4. The method of claim 1, wherein the determining the desired value for the one or more memory power state transition timer settings comprises: accessing a look-up table to determine the desired value based on the one or more parameters.

5. The method of claim 1, wherein the determining the desired value for the one or more memory power state transition timer settings comprises calculating the desired value based on an average idle timer duration.

6. The method of claim 1, wherein the memory device comprises a dynamic random access memory (DRAM) device, and the memory power state transition timer settings comprise a power down timer setting and a page down timer setting for transitioning the DRAM device to a low power mode.

7. The method of claim 1, wherein the determining the desired value for the one or more memory power state transition timer settings comprises an iterative search of a plurality of setting values.

8. A system for dynamically adjusting memory power state transition timers, the system comprising:
   means for receiving one or more parameters corresponding to usage of a memory device coupled to a processor in a computing device, the parameters comprising a memory utilization percentage and one or more of a memory traffic pattern, a memory operating frequency, a memory traffic amount, and a power/performance mode;
   means for determining a desired value for one or more memory power state transition timer settings for the memory device based on the one or more parameters; and
   means for updating a current value for the memory power state transition timer settings for the memory device with the desired value.

9. The system of claim 8, wherein the memory power state transition timer settings comprise an idle timer setting for entering a lower power memory state.

10. The system of claim 8, wherein the means for receiving one or more parameters impacting usage of the memory device comprises: means for monitoring and detecting a change in the one or more parameters.

11. The system of claim 8, wherein the means for determining the desired value for the one or more memory power state transition timer settings comprises: means for accessing a look-up table to determine the desired value based on the one or more parameters.

12. The system of claim 8, wherein the means for determining the desired value for the one or more memory power state transition timer settings comprises means for calculating the desired value based on an average idle timer duration.

13. The system of claim 8, wherein the memory device comprises a dynamic random access memory (DRAM) device, and the memory power state transition timer settings comprise a power down time setting and a page down timer setting for transitioning the DRAM device to a low power mode.

14. The system of claim 8, wherein the means for determining the desired value for the one or more memory power state transition timer settings comprises a means for iteratively searching of a plurality of setting values.

15. A computer program embodied in a non-transitory computer readable medium and executable by a processor for dynamically adjusting memory power state transition timers, the computer program comprising logic configured to:
   receive one or more parameters corresponding to usage of a memory device coupled to a processor in a computing device, the parameters comprising a memory utilization percentage and one or more of a memory traffic pattern, a memory operating frequency, a memory traffic amount, and a power/performance mode;
   based on the one or more parameters, determine a desired value for one or more memory power state transition timer settings for the memory device; and
   update a current value for the memory power state transition timer settings for the memory device with the desired value.

16. The computer program of claim 15, wherein the memory power state transition timer settings comprise an idle timer setting for entering a lower power memory state.

17. The computer program of claim 15, wherein the logic configured to determine the desired value for the one or more memory power state transition timer settings comprises logic configured to: access a look-up table to determine the desired value based on the one or more parameters.

18. The computer program of claim 15, wherein the logic configured to determine the desired value for the one or more memory power state transition timer settings comprises logic configured to: calculate the desired value based on an average idle timer duration.

19. The computer program of claim 15, wherein the memory device comprises a dynamic random access memory (DRAM) device, and the memory power state transition timer settings comprise a power down time setting and a page down timer setting for transitioning the DRAM device to a low power mode.

20. The computer program of claim 15, wherein the logic configured to determine the desired value for the one or more memory power state transition timer settings comprises an iterative search of a plurality of setting values.

21. A computer system comprising:
   a memory device;
   a system on chip (SoC) comprising a processor and a memory controller, the memory controller electrically coupled to the memory device; and
   a memory scheduler executed by the processor, the memory scheduler configured to:
      monitor one or more parameters corresponding to usage of the memory device, the parameters comprising a memory utilization percentage and one or more of a memory traffic pattern, a memory operating frequency, a memory traffic amount, and a power/performance mode, and
      determine based on the monitored parameters an desired value for one or more memory power state transition timer settings used by the memory controller to enter a low power memory state.

22. The computer system of claim 21, wherein the memory power state transition timer settings comprise an idle timer setting.

23. The computer system of claim 21, wherein the desired value for the one or more memory power state transition timer settings is determined by accessing a look-up table.

24. The computer system of claim 21, wherein the desired value is calculated based on an average idle timer duration.

25. The computer system of claim 21, wherein the memory device comprises a dynamic random access memory (DRAM) device, and the memory power state transition timer settings comprise a power down time setting and a page down timer setting for entering the low power memory state.

\* \* \* \* \*